United States Patent [19]
Krajec et al.

[11] Patent Number: 5,465,476
[45] Date of Patent: Nov. 14, 1995

[54] HDA HEADLOAD CARRIAGE TOOLING

[75] Inventors: Russell S. Krajec, Berthoud; Vincent L. Preston, Longmont, both of Colo.

[73] Assignee: Maxtor Corporation, San Jose, Calif.

[21] Appl. No.: 152,535

[22] Filed: Nov. 16, 1993

[51] Int. Cl.[6] .................................................. G11B 5/42
[52] U.S. Cl. ........................ 29/759; 29/281.5; 29/468; 29/603
[58] Field of Search .......................... 29/603, 758, 759, 29/468, 281.5

[56] References Cited

U.S. PATENT DOCUMENTS 5,265,325  11/1993  Fortin ......................................... 29/603

Primary Examiner—Carl E. Hall

[57] ABSTRACT

An assembly station that loads heads onto a disk of a hard disk drive and allows a crash stop to be mounted to the drive unit. The assembly station includes a load arm positioner which can slide along an annular ring. Mounted to the load arm positioner is a scissor assembly tool which can engage and separate the actuator arms. The load arm positioner can be moved about the annular ring so that the scissors engage the actuator arms and load the heads onto the disk. The pivot point of the actuator arms is located at the center of the annular ring so that there is no relative movement between the scissor tool and the actuator arms when the heads are loaded onto the disk.

28 Claims, 6 Drawing Sheets

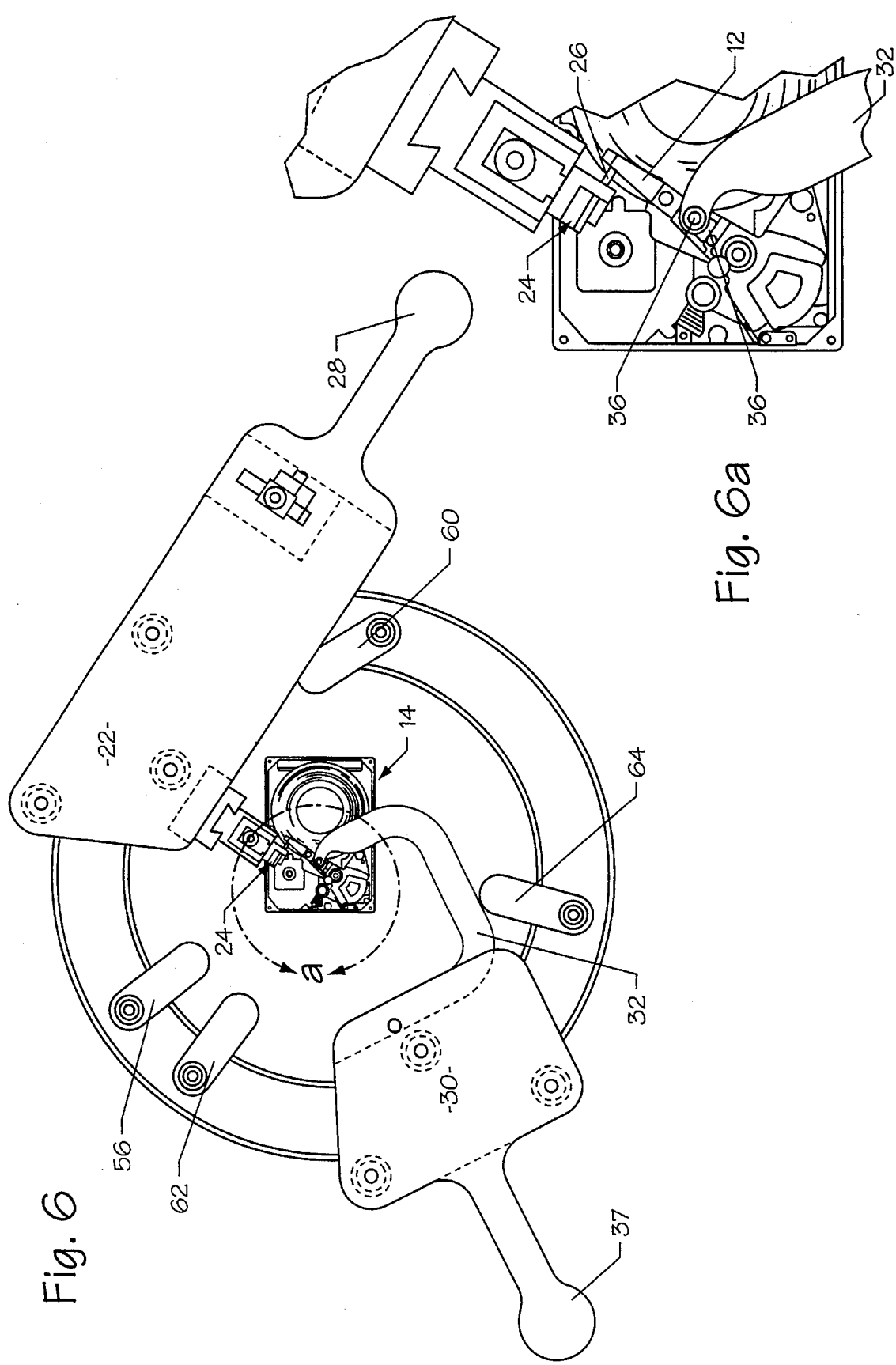

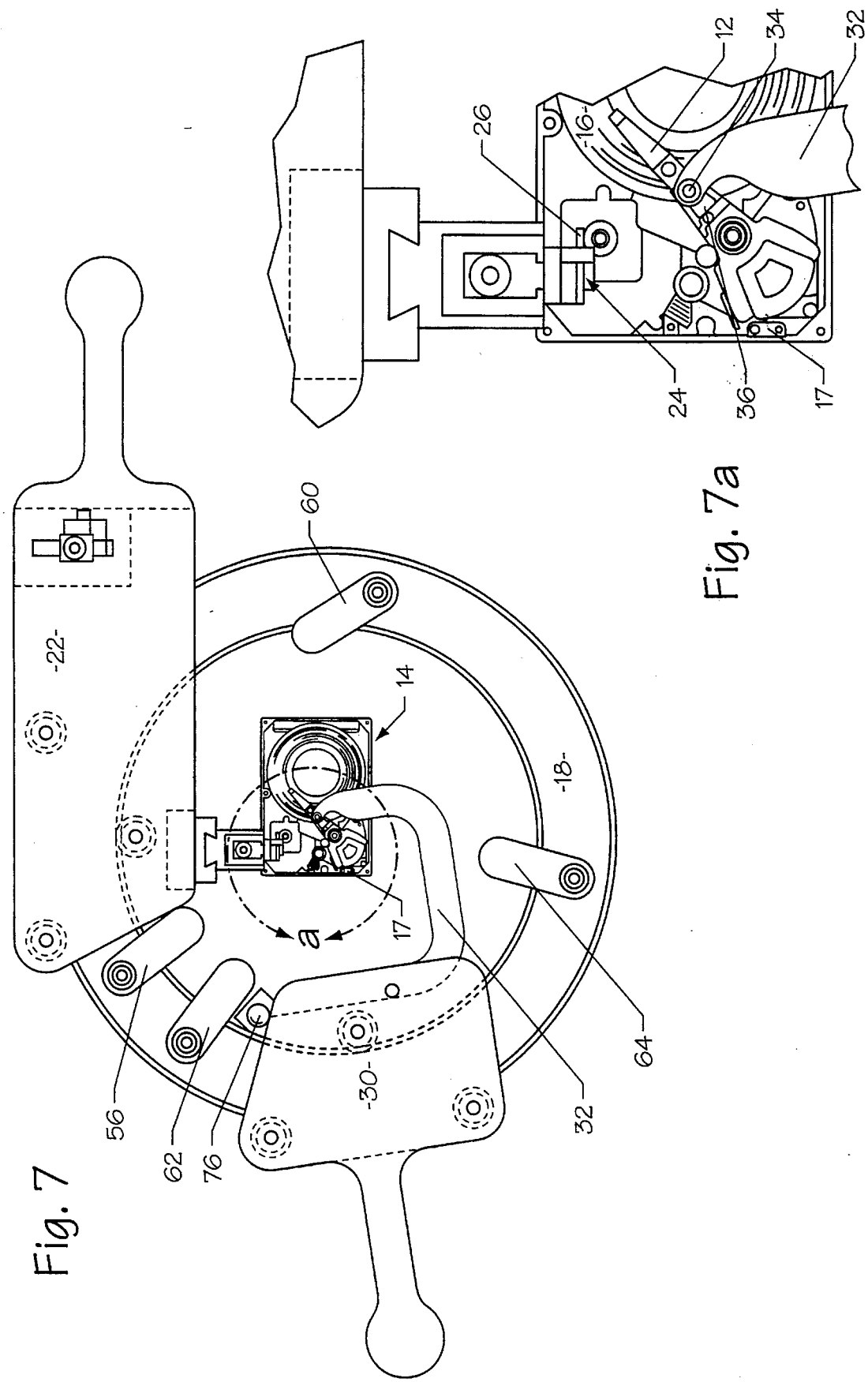

HDA HEADLOAD CARRIAGE TOOLING

BACKGROUND OF THE INVENTION

1. Field of the Invention

The present invention relates to an assembly station that loads heads onto the disk of a hard disk drive.

2. Description of Related Art

Hard disk drives contain magnetic disk which spin relative to one or more magnetic heads. The magnetic heads are suspended above the surface of the magnetic disk by an actuator arm which has a magnet/coil assembly that moves the heads relative to the disk. During operation, the head is separated from the surface of the disk by an air bearing that is created by the rotation of the disk.

Disk drives are typically assembled by first mounting a spin motor and actuator arm assembly to a baseplate, and then attaching the magnetic disk to the motor. To provide clearance for the installation of the motor and the magnetic disk, the disk and actuator arm are initially mounted so that the magnetic head is located away from the disk. After the magnetic disk and actuator arm are installed, the head is rotated to a position above the disk. The head loading process is typically performed with some type of automated tooling which lifts and rotates the magnetic heads.

Actuator arms typically have a large aspect ratio, resulting in an arm that is relatively flexible and weak. Consequently the arms tend to sag under the force of gravity. If multiple heads are being loaded onto the disk, the heads must be separated to assure clearance above the disk surface. Therefore most conventional head loading tools have means to separate and support multiple magnetic heads when the heads are being loaded onto the disk. One common type of head loading tool contains two sets of fingers which can engage the heads and move relative to each other in a scissor-like fashion. Relative movement of the fingers separates the magnetic heads, so that the heads clear the disk surface when the actuator arm is rotated above the disk. The separation of the magnetic heads must be sufficient to insure that the heads do not come into contact with the surface of the disk during the loading process. Contact between the head and the disk surface may cause damage to the head or disk, resulting in a defective drive unit. Defective drive units lower the yield of the assembly process and invariably raise the cost of production.

Relative movement between the actuator arms and loading tool may create particles that contaminate the drive. Most commercially available hard disk drive units contain rotary actuators that pivot about a bearing assembly. Therefore, to prevent the actuators arms from moving relative to the tool, the movement of the scissors must be primarily rotational when loading heads onto a disk. The prior art includes automated head loaders which rotate the disk drive while the heads are being loaded onto the disk. These devices are relatively expensive and are not conducive to use on a conveyor assembly system. It would therefore be desirable to have an inexpensive assembly station that can effectively load heads onto the disk of a hard disk drive.

SUMMARY OF THE INVENTION

The present invention is an assembly station that loads heads onto a disk of a hard disk drive and allows a crash stop to be mounted to the drive unit. The assembly station includes a load arm positioner which can slide along an annular ring. Mounted to the load arm positioner is a scissor assembly tool which can engage and separate the actuator arms. The load arm positioner can be moved about the annular ring so that the scissors engage the actuator arms and load the heads onto the disk. The pivot point of the actuator arms is located at the center of the annular ring so that there is no relative movement between the scissor tool and the actuator arms when the heads are loaded onto the disk.

The assembly station also includes an actuator positioner that can also slide along the annular ring. The actuator positioner includes a pin which can be inserted into a slot in the actuator and maintain the arms in a middle disk position while a crash stop is mounted to the disk drive. The actuator positioner also holds the actuator arms while the scissor tool is disengaged from the arms.

It is therefore an object of the present invention to provide an assembly station which can load heads onto a disk without causing relative movement between the head loading tool and the head.

It is also an object of the present invention to provide a head loading assembly station which allows for the installation of a crash stop.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 1a is an enlarged view of the disk drive in FIG. 1;

FIG. 6 is a top plane view similar to FIG. 1, showing an actuator positioner rotated so that a pin can be fastened to the actuator arms;

FIG. 6a is an enlarged view of the disk drive in FIG. 6;

FIG. 7 is a top plane view similar to FIG. 1, showing the actuator positioner rotated to disengage the scissors from the actuator arms;

FIG. 7a is an enlarged view of the disk drive in FIG. 7.

DETAILED DESCRIPTION OF THE INVENTION

Figure 1:
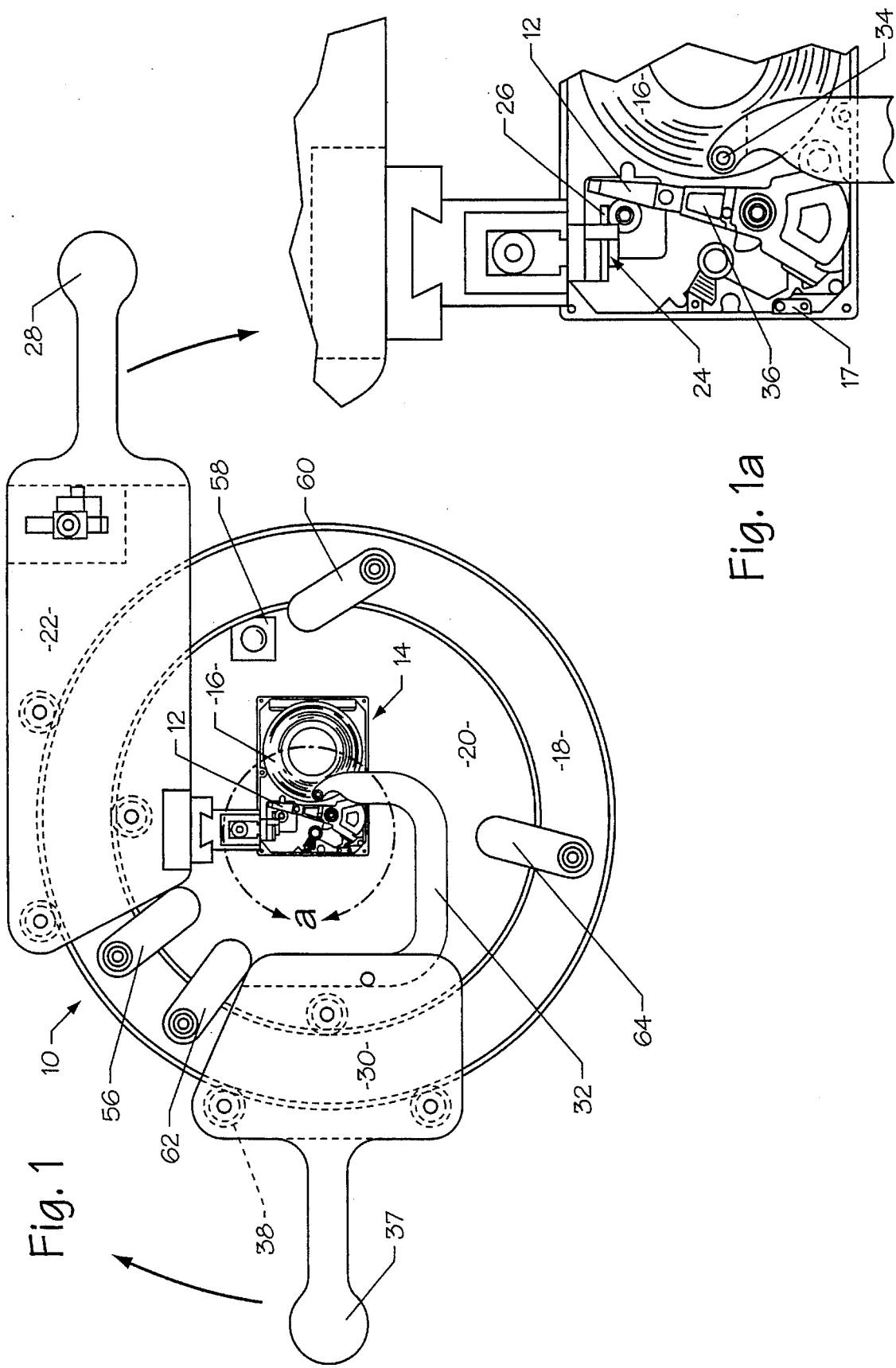
FIG. 1 is a top plane view of an assembly station of the present invention.

Referring to the drawings more particularly by reference numbers, FIG. 1 shows an assembly station 10 of the present invention. The station 10 is typically used to load the actuator arms 12 of a hard disk drive 14 onto the disk 16 of the drive. The assembly station 10 can also be used to mount a crash stop 17 to the drive unit 14.

Figure 2:
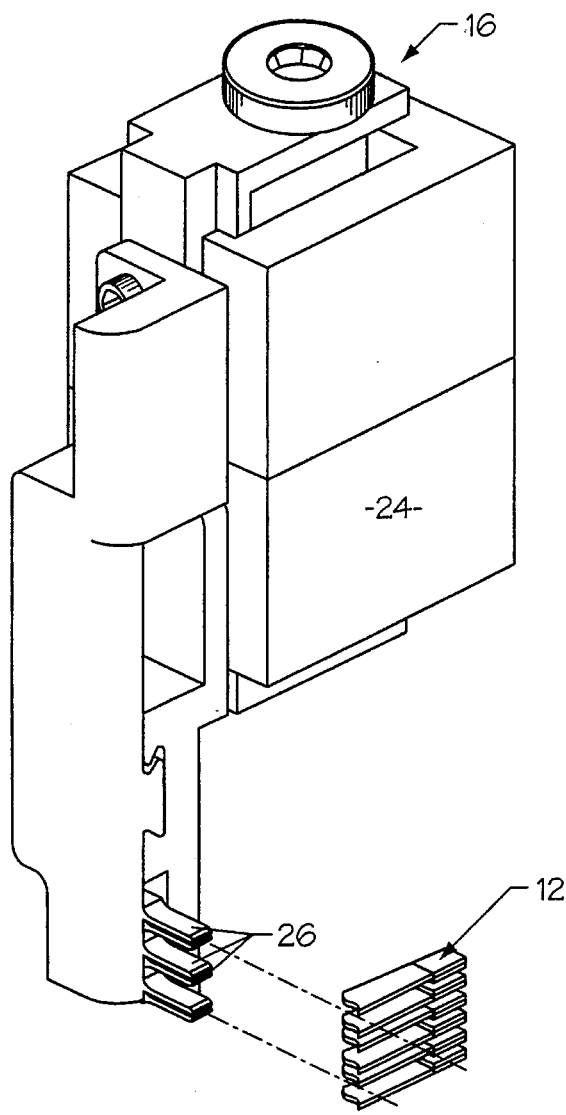
FIG. 2 is a perspective view of a scissor assembly of the station.

The station 10 includes a fixed annular ring 18 which has an opening 20 that allows the disk drive 14 to be placed therein. Coupled to the annular ring 18 is a load arm positioner 22 that can slide along the ring 18 as indicated by the arrows. Attached to the load arm positioner 22 is a load assembly tool 24. As shown in FIG. 2, in the preferred embodiment the tool 24 is a scissor assembly which has a plurality of fingers 26. The tool 24 includes an actuator (not shown) which can separate corresponding pairs of the fingers 26. The fingers 26 can be inserted between the actuator arms 12 of the hard disk drive, wherein the arms 12 can be moved by the positioner 22 to a location on the disk 16. The load arm positioner 22 includes a handle 28 that can be grasped by the operator to move the positioner 22 relative to the ring 18 and the scissor tool 24 relative to the disk drive 14.

The station 10 also includes an actuator positioner 30 coupled to the annular ring 18. The actuator positioner 30 is adapted to slide along the ring 18 as indicated by the arrows. Mounted to the positioner 30 is an arm 32 that extends into the opening 20. Attached to the end of the arm 32 is a pin 34 that can be inserted into a slot 36 located within the actuator arms 12. The pin 34 and actuator positioner 30 can be used to move and maintain the location of the actuator arms 12. The actuator positioner 30 may include a handle 37 that can be grasped by the operator to move the positioner 30 relative to the ring 18 and the pin 34 relative to the hard disk drive 14. Although manually operated handles are shown and described, it is to be understood that the positioners 22 and 30 can be moved about the ring 18 by electric motors or other similar means.

Figure 3:
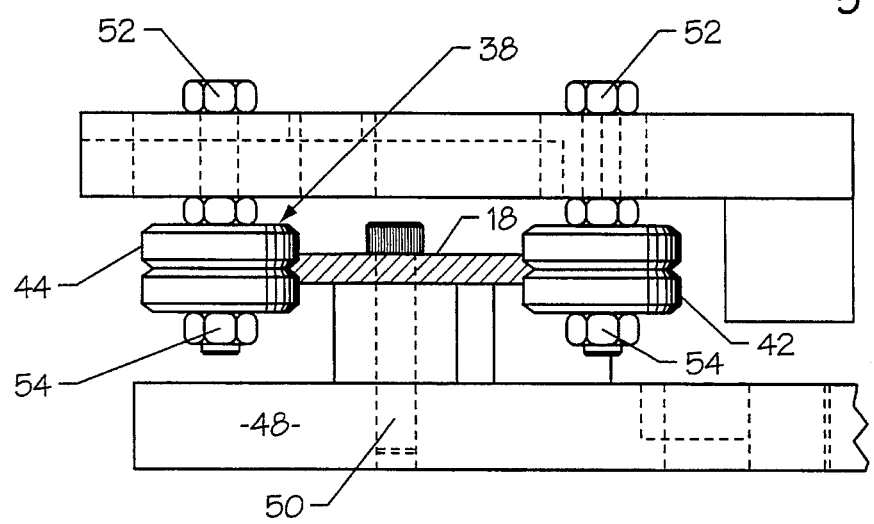
FIG. 3 is a side view of a bearing assembly of the station.

As shown in FIG. 3 the positioners 22 and 30 are each coupled to the ring 18 by a bearing assembly 38. Each bearing assembly 38 includes a pair of outer V-shaped bearings 40 and an inner V-shaped bearing 42. The bearings have tapered grooves 44 that cooperate with corresponding tapered outer surfaces 46 of the ring 18 to capture the bearings while allowing the positioners 22 and 30 to move relative to the ring 18. The ring 18 is typically coupled to a base plate 48 by screws 50. The positioners 22 and 30 may be connected to the V-shaped bearings 42 by bolts 52 and accompanying nuts 54.

Referring to FIG. 1, the station 10 includes position stops 56–64. The first position stop 56 provides a load arm positioner 22 position so that the tool 24 is located away from the actuator arms 12. The positioner 22 is typically moved next to the first stop 56 when the hard disk drive 14 is being loaded into the station 10. The second stop 58 interrupts movement of the positioner 22 at a position where the scissors 24 have engaged the arms 12. The second stop 58 may be coupled to a sensor system (not shown) which activates the tool actuator and separates the scissor fingers 26 and corresponding actuator arms 12. The second stop 58 may also be coupled to an actuator (not shown) which pulls the stop 58 into the annular ring 18 so that the positioner 22 can continue rotation about the ring 18. The third stop 60 stops the positioner 22 at a position where the actuator arms 12 are located adjacent to an outer diameter portion of the disk 16.

The fourth stop 62 provides an actuator positioner 30 position, such that the pin 34 is located away from the actuator arms 12 when the disk drive 14 is loaded into the station 10. The fifth stop 64 corresponds to a positioner 30 position such that the pin 34 is adjacent to the actuator arms 12 at the outer diameter portion of the disk.

Figure 4:
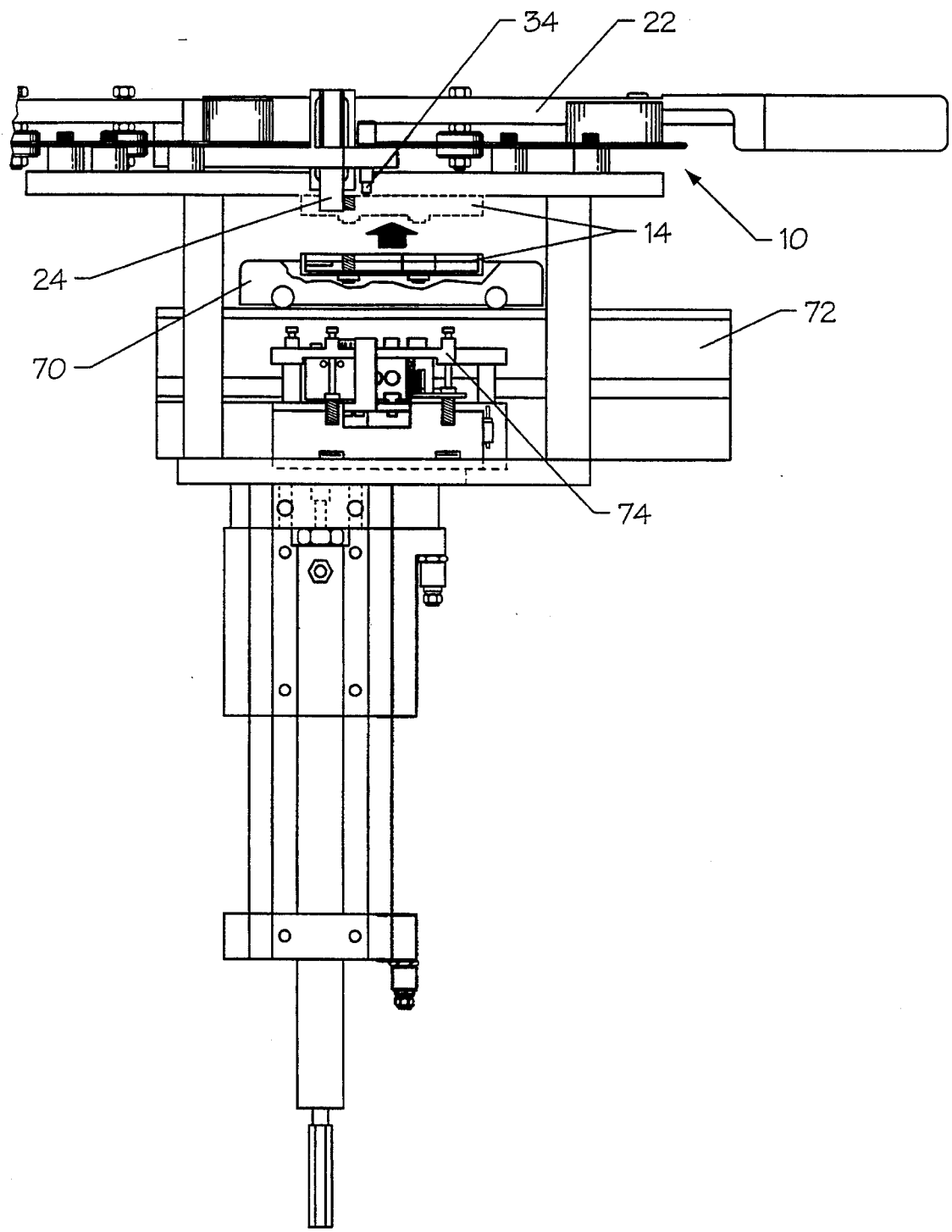
FIG. 4 is a side view showing a disk drive being loaded into the station from a conveyor system.

In operation, as shown in FIG. 4, the disk drive 14 is typically supported by a pallet 70 and moved to the station 10 by a conveyor system 72. The station 10 and conveyor 72 may have a sensor system (not shown) which senses the presence of a pallet 70 and stops the disk drive 14 beneath the station 10. The pallet 70 may have an opening which allows a lift 74 to lift the disk drive 14 into the opening 20 of the ring 18.

Figures 5, 5A:
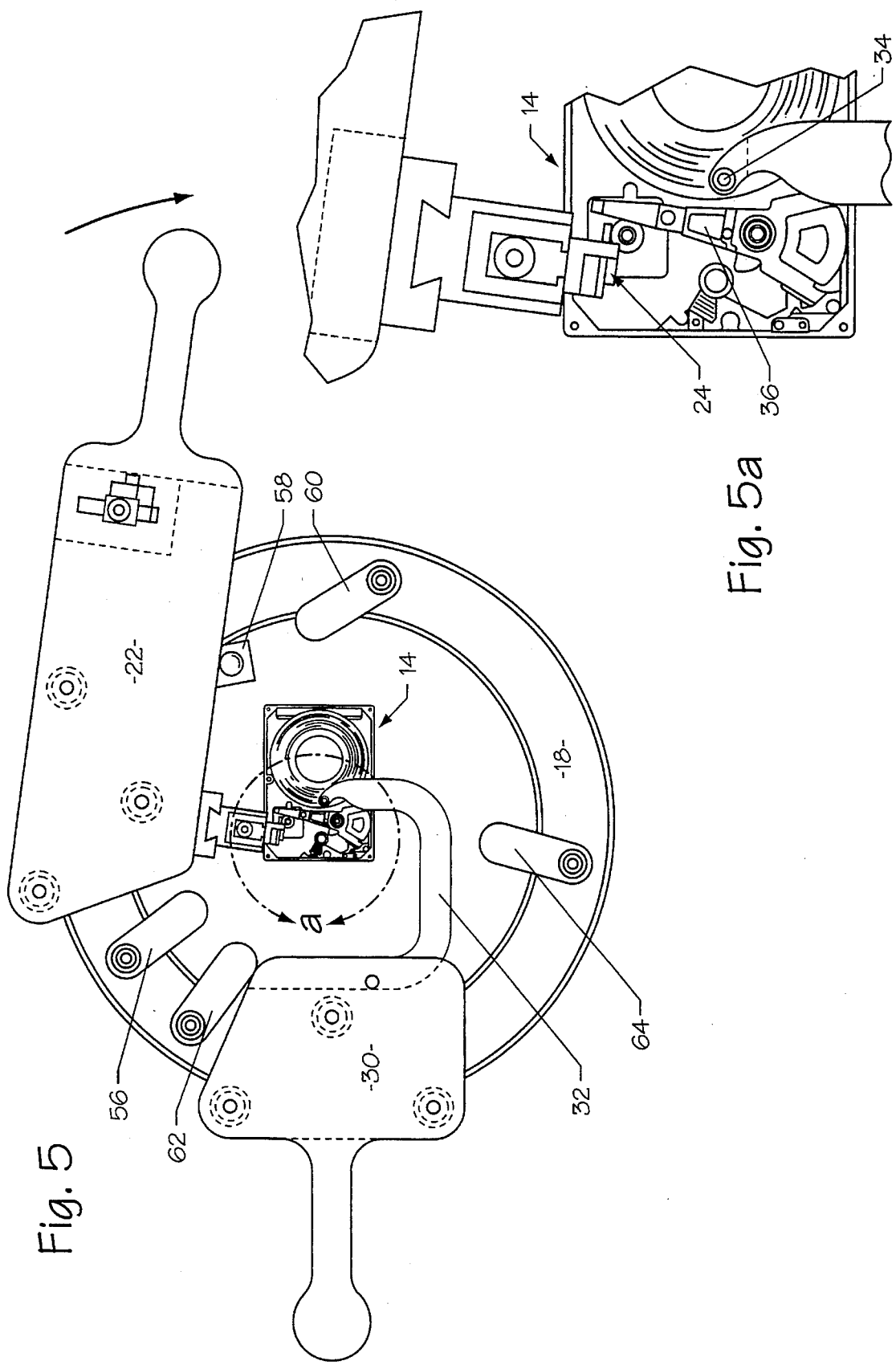
FIG. 5 is a top plane view similar to FIG. 1, showing the scissors move into engagement with the actuator arms of a hard disk drive.
FIG. 5a is an enlarged view of the disk drive in FIG. 5.

FIG. 1 shows the location of the positioners 22 and 30 when the disk drive 14 is loaded into the station 10. Both the scissors 24 and pin 34 are located away from the actuator arms 12 so as to not damage the same. As shown in FIGS. 5 and 5a, the operator then moves the load arm positioner 22 to the second stop 58, wherein the scissors 24 engage and separate the actuator arms 12. The operator then moves the positioner 22 to the third stop 60, wherein the actuator arms 12 are located above the outer diameter of the disk.

As shown in FIGS. 6 and 6a, after the actuator arms 12 are loaded onto the disk 16, the operator moves the actuator positioner 30 to the fifth stop 64, where the pin 34 is inserted into the slot 36 of the actuator arms 12. As shown in FIGS. 7 and 7a, the positioner 30 is then moved about the ring 18 into a sixth stop 76 while the load arm positioner 22 is maintained in the same position, wherein the actuator arms 12 are disengaged from the scissors 24. The crash stop 17 is then fastened to the disk drive 14 with a torque driver (not shown). The pin 34 is removed from slot 36 and the disk drive is lowered back into the pallet 70 which is transported to another location by the conveyor 72. The sixth stop 76 is constructed similar to the second stop 58 wherein the stops 76 is retracted to allow the positioner 30 to rotate to the fourth stop 62.

Although a method for loading the actuator arms 12 onto the disk 16 has been shown and described, it is to be understood that the station 10 can be used as a rework station to remove the actuator arm assembly. To remove the actuator arm assembly, the disk drive 14 is loaded into the station 10 and the crash stop 17 is removed with a torque driver. The actuator positioner 30 is moved about the ring 18 so that the pin 34 can be inserted into the slot 36 of the arms 12. The positioner 30 is then moved so that the arms 12 are rotated to the outer diameter of the disk. The load arm positioner 22 is rotated to move the tool 24 into the actuator arms, where the scissors separate the arms. The positioner 22 is then further rotated to unload the arms 12 from the disk 16. The operator detaches the pin 34 from the slot 36 and disengages the scissors from the arms by moving the positioner 22 to the first stop 56. The actuator arm assembly can then be removed with a torque driver.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An assembly station that loads at least a pair of actuator arms onto a disk of a hard disk drive, comprising:

actuator arm engagement means for engaging and separating the actuator arms;

actuator arm movement means for moving said actuator arm engagement means and the actuator arms relative to the disk; and, actuator arm positioner means for engaging the actuator arms and moving the actuator arms away from said actuator arm engagement means.

2. The assembly station as recited in claim 1, wherein said actuator arm positioner means includes a pin that extends from an actuator positioner, said pin being adapted to be attached to the actuator arms.

3. The assembly station as recited in claim 2, wherein said actuator positioner is coupled to an annular ring by a actuator positioner bearing assembly such that said actuator positioner and pin can move along said annular ring.

4. The assembly station as recited in claim 3, wherein said actuator positioner includes an actuator handle which allows an operator to move said actuator positioner about said annular ring.

5. The assembly station as recited in claim 2, wherein said actuator positioner bearing assembly includes a plurality of actuator V-bearings coupled to said annular ring which has corresponding V-shaped bearing surfaces.

6. The assembly station as recited in claim 1, wherein said actuator arm movement means includes a load arm positioner that is coupled to an annular ring by a load arm bearing assembly such that said load arm positioner can move along said annular ring.

7. The assembly station as recited in claim 6, wherein said load arm positioner includes a load handle which allows an operator to rotate said load arm positioner about said annular ring.

8. The assembly station as recited in claim 6, wherein said actuator positioner bearing assembly includes a plurality of load arm V-bearings coupled to said annular ring which has corresponding V-shaped bearing surfaces.

9. The assembly station as recited in claim 6, wherein said actuator arm engagement means includes a pair of scissors that engage and separate the actuator arms.

10. The assembly station as recited in claim 1, further comprising first stop means for engaging said actuator arm movement means at a position wherein said actuator arm engagement means is located away from the actuator arms.

11. The assembly station as recited in claim 10, further comprising second stop means for engaging said actuator arm movement means at a position wherein said actuator arm engagement means engages the actuator arms.

12. The assembly station as recited in claim 11, further comprising third stop means for engaging said actuator arm movement means at a position wherein said actuator arm engagement means locates the actuator arms adjacent to the disk.

13. The assembly station as recited in claim 12, further comprising fourth stop means for engaging said actuator arm stop means at a position wherein said actuator arm stop means is located away from the actuator arms.

14. The assembly station as recited in claim 13, further comprising fifth stop means for engaging said actuator arm movement means at a position wherein said actuator arm stop means can be attached to the actuator arms.

15. An assembly station that loads at least a pair of actuator arms onto a disk of a hard disk drive, comprising:
   an annular ring;
   a load arm positioner coupled to said annular ring such that said load arm positioner can move along said annular ring; and,
   an actuator arm load tool that is mounted to said load arm positioner and adapted to engage and separate the actuator arms.

16. The assembly station as recited in claim 15, further comprising an actuator positioner coupled to said annular ring such that said actuator positioner can move along said annular ring, and a pin that is connected to said actuator positioner and be attached to the actuator arms.

17. The assembly station as recited in claim 16, further comprising first stop means for engaging said load arm positioner at a position wherein said actuator arm load tool is located away from the actuator arms.

18. The assembly station as recited in claim 17, further comprising second stop means for engaging said load arm positioner at a position wherein said actuator arm load tool engages the actuator arms.

19. The assembly station as recited in claim 18, further comprising third stop means for engaging said load arm positioner at a position wherein said actuator arm load tool locates the actuator arms adjacent to the disk.

20. The assembly station as recited in claim 19, further comprising fourth stop means for engaging said actuator positioner at a position wherein said actuator positioner is located away from the actuator arms.

21. The assembly station as recited in claim 20, further comprising fifth stop means for engaging said actuator positioner at a position wherein said actuator positioner can be attached to the actuator arms.

22. The assembly station as recited in claim 15, wherein said load arm positioner is coupled to said annular ring by a plurality of load arm V-bearings.

23. The assembly station as recited in claim 22, wherein said load arm positioner includes a load handle which allows an operator to move said load arm positioner about said annular ring.

24. The assembly station as recited in claim 21, wherein said actuator positioner is coupled to said annular ring by a plurality of actuator V-bearings.

25. The assembly station as recited in claim 24, wherein said actuator positioner includes an actuator handle which allows an operator to move said actuator positioner about said annular ring.

26. The assembly station as recited in claim 25, wherein said load arm positioner is coupled to said annular ring by a plurality of load arm V-bearings.

27. The assembly station as recited in claim 26, wherein said load arm positioner includes a load handle which allows an operator to move said load arm positioner about said annular ring.

28. The assembly station as recited in claim 27, wherein said actuator arm load tool includes a pair of scissors that engage and separate the actuator arms.

* * * * *